United States Patent
Butler et al.

(10) Patent No.: US 7,186,765 B2
(45) Date of Patent: *Mar. 6, 2007

(54) METHOD FOR PREPARATION OF STABLE BITUMEN POLYMER COMPOSITIONS

(75) Inventors: James R. Butler, Friendswood, TX (US); Kevin P. Kelly, Friendswood, TX (US); Paul Buras, West University Place, TX (US)

(73) Assignee: Fina Technology, Inc., Houston, TX (US)

( * ) Notice: Subject to any disclaimer, the term of this patent is extended or adjusted under 35 U.S.C. 154(b) by 164 days.

This patent is subject to a terminal disclaimer.

(21) Appl. No.: 10/888,563

(22) Filed: Jul. 9, 2004

(65) Prior Publication Data

US 2005/0038142 A1 Feb. 17, 2005

Related U.S. Application Data

(63) Continuation-in-part of application No. 09/712,670, filed on Nov. 14, 2000, now abandoned, which is a continuation-in-part of application No. 09/389,785, filed on Sep. 4, 1999, now Pat. No. 6,180,697.

(51) Int. Cl.
*C08L 95/00* (2006.01)
(52) U.S. Cl. ............................. 524/68; 524/70; 524/71
(58) Field of Classification Search .................. 524/68, 524/70–71
See application file for complete search history.

(56) References Cited

U.S. PATENT DOCUMENTS

| | | | |
|---|---|---|---|
| 3,803,066 A | 4/1974 | Petrossi .................... 260/28.5 |
| 4,129,542 A | 12/1978 | Matheson et al. ......... 260/28.5 |
| 4,130,516 A | 12/1978 | Gagle et al. ............... 260/28.5 |
| 4,145,322 A | 3/1979 | Maldonado et al. ....... 260/28.5 |
| 4,242,246 A | 12/1980 | Maldonado et al. ....... 260/28.5 |
| 4,412,019 A | 10/1983 | Kraus ........................ 524/71 |
| 4,503,176 A | 3/1985 | Barlow et al. ................ 524/62 |
| 4,740,322 A | 4/1988 | DiBiase et al. ............ 252/47.5 |
| 4,956,500 A | 9/1990 | Vermilion .................. 525/54.5 |
| 5,017,230 A | 5/1991 | Hopkins et al. .......... 106/284.3 |
| 5,078,905 A | 1/1992 | Trinh et al. ............ 252/182.17 |
| 5,104,916 A * | 4/1992 | Trinh et al. .................... 524/71 |
| 5,120,777 A | 6/1992 | Chaverot et al. .............. 524/62 |
| 5,151,456 A | 9/1992 | Elias et al. .................... 524/60 |
| 5,314,935 A | 5/1994 | Chaverot et al. .............. 524/64 |
| 5,371,121 A | 12/1994 | Bellomy et al. ............... 524/68 |
| 5,382,612 A | 1/1995 | Chaverot et al. .............. 524/60 |
| 5,508,112 A | 4/1996 | Planche et al. ............. 428/489 |
| 5,605,946 A | 2/1997 | Planche et al. ................ 524/68 |
| 5,618,862 A | 4/1997 | Germanaud et al. .......... 524/68 |
| 5,672,642 A | 9/1997 | Gros ............................ 524/68 |
| 5,710,196 A | 1/1998 | Willard ........................ 524/68 |
| 5,733,955 A | 3/1998 | Schulz et al. ................. 524/69 |
| 5,756,563 A | 5/1998 | Brandolese et al. ......... 523/351 |
| 5,756,565 A | 5/1998 | Germanaud et al. .......... 524/68 |
| 5,773,496 A | 6/1998 | Grubba ........................ 524/68 |
| 5,795,929 A | 8/1998 | Grubba ........................ 524/60 |
| 5,807,911 A | 9/1998 | Drieskens et al. ............ 524/60 |
| 5,874,492 A | 2/1999 | Planche et al. ................ 524/68 |
| 5,880,185 A | 3/1999 | Planche et al. ................ 524/68 |
| 6,133,351 A | 10/2000 | Hayner ........................ 524/62 |
| 6,153,004 A | 11/2000 | Hayner ........................ 106/274 |
| 6,310,122 B1 | 10/2001 | Butler et al. .................. 524/60 |
| 6,767,939 B2 * | 7/2004 | Butler et al. .................. 524/71 |

OTHER PUBLICATIONS

SUPERPAVE, Performance Graded Asphalt Binder Specification and Testing, Superpave Series No. 1 (SP-1), 1997 Printing, pp. 1-67.

* cited by examiner

*Primary Examiner*—Peter Szekely
(74) *Attorney, Agent, or Firm*—Shirley A. Kopecky

(57) ABSTRACT

The present invention provides a method for preparing an asphalt and thermoplastic elastomer composition. The process comprises heating an asphalt cut in a stirred tank to a temperature sufficient to allow the stirring of the asphalt in the tank. A thermoplastic elastomer or rubber is added to the asphalt while continuing to stir the asphalt. The mixture is stirred at a speed and for a period of time sufficient to increase the distribution of the elastomer into the asphalt. The stirring speed is reduced and the temperature is increased to add crosslinking agents to the tank. Stirring is continued for a period of time sufficient to improve the distribution of the crosslinking agent dispersion in the asphalt. Crosslinking agents include compositions of mercaptobenzothiazole, zinc oxide and elemental sulfur; compositions of mercaptobenzothiazole, zinc oxide, and mixed polythiomorpholine; and compositions of zinc 2-mercaptobenzothiazole and dithiodimorpholine.

13 Claims, No Drawings

METHOD FOR PREPARATION OF STABLE BITUMEN POLYMER COMPOSITIONS

CROSS REFERENCE TO OTHER PATENT APPLICATIONS

This application is a continuation-in-part of a prior U.S. application Ser. No. 09/712,670 filed Nov. 14, 2000, now abandoned, that is in turn which is a continuation-in-part of application Ser. No. 09/389,785 filed Sep. 4, 1999 now U.S. Pat. No. 6,180,697.

This application claims priority under 35 U.S.C. 120 of parent application Ser. No. 09/712,670 and U.S. Pat. No. 6,180,697, the contents of which are incorporated herein as if set forth in full.

BACKGROUND OF THE INVENTION

This invention is directed to bitumen compositions, which are prepared from bitumen, polymers such as copolymers of styrene and a conjugated-diene, and defined amounts of crosslinking agents such as sulfur. The bitumen compositions described herein are useful in industrial applications; such as in hot mix asphalts useful in preparing aggregates for road paving.

The use of bitumen (asphalt) compositions in preparing aggregate compositions (bitumen+rock) useful as road paving material is complicated by at least three factors, each of which imposes a serious impediment to providing an acceptable product. First, the bitumen compositions must meet certain performance criteria or specifications in order to be considered useful for road paving. For example, to ensure acceptable performance, state and federal agencies issue specifications for various bitumen applications including specifications for use as road pavement. Current Federal Highway Administration specifications designate a bitumen (asphalt) product, for example, AC-20R as meeting defined parameters relating to properties such as viscosity, toughness, tenacity and ductility (see Table 1). Each of these parameters define a critical feature of the bitumen composition, and compositions failing to meet one or more of these parameters will render that composition unacceptable for use as road pavement material.

Conventional bitumen compositions frequently cannot meet all of the requirements of a particular specification simultaneously and, if these specifications are not met, damage to the resulting road can occur, including permanent deformation, thermally induced cracking and flexural fatigue. This damage greatly reduces the effective life of paved roads.

In this regard, it has long been recognized that the properties of conventional bitumen compositions can be modified by the addition of other substances, such as polymers. A wide variety of polymers have been used as additives in bitumen compositions. For example, copolymers derived from styrene and conjugated dienes, such as butadiene or isoprene, are particularly useful, since these copolymers have good solubility in bitumen compositions and the resulting modified-bitumen compositions have good rheological properties.

It is also known that the stability of polymer-bitumen compositions can be increased by the addition of crosslinking agents such as sulfur, frequently in the form of elemental sulfur. It is believed that the sulfur chemically couples the polymer and the bitumen through sulfide and/or polysulfide bonds. The addition of extraneous sulfur is required to produce the improved stability, even though bitumens naturally contain varying amounts of native sulfur.

Thus, U.S. Pat. No. 4,145,322, issued Mar. 20, 1979 to Maldonado et al., discloses a process for preparing a bitumen-polymer composition consisting of mixing a bitumen, at 266°–446° F. (130°–230° C.), with 2 to 20% by weight of a block copolymer, having an average molecular weight between 30,000 and 300,000, with the theoretical formula $S_x\text{-}B_y$, in which S corresponds to styrene structure groups and B corresponds to conjugated diene structure groups, and x and y are integers. The resulting mixture is stirred for at least two hours, and then 0.1 to 3% by weight of sulfur relative to the bitumen is added and the mixture agitated for at least 20 minutes. The preferred quantity of added sulfur cited in this patent is 0.1 to 1.5% by weight with respect to the bitumen. The resulting bitumen-polymer composition is used for road coating, industrial coating, or other industrial applications.

Similarly, U.S. Pat. No. 4,130,516, issued Dec. 19, 1978 to Gagle et al., discloses an asphalt (bitumen) polymer composition obtained by hot-blending asphalt with 3 to 7% by weight of elemental sulfur and 0.5 to 1.5% by weight of a natural or synthetic rubber, preferably a linear, random butadiene/styrene copolymer. U.S. Pat. No. 3,803,066, issued Apr. 9, 1974 to Petrossi, also discloses a process for preparing a rubber-modified bitumen by blending rubber, either natural or synthetic, such as styrene/butadiene rubber, with bitumen at 293°–365° F. (145°–185° C.), in an amount up to 10% by weight based on the bitumen, then adjusting the temperature to 257°–320° F. (125°–160° C.), and intimately blending into the mix an amount of sulfur such that the weight ratio of sulfur to rubber is between 0.3 and 0.9. A catalytic quantity of a free-radical vulcanization-accelerator is then added to effect vulcanization. This patent recites the critical nature of the sulfur to rubber ratio, and teaches that weight ratios of sulfur to rubber of less than 0.3 gives modified bitumen of inferior quality.

Although polymer-modified bitumen compositions are known, these previously described compositions are not necessarily useful for road paving applications. For example, mixing NorthWest paving asphalt having an initial viscosity of 682 poise at 140° F. (60° C.) with 3.6 weight percent Kraton®-4141, a commercially available styrene-butadiene tri-block copolymer which contains 29 weight percent plasticizer oil, and 0.25% sulfur gives a modified-asphalt composition with a viscosity of 15,000 poise at 140° F. (60° C.). This viscosity, however, greatly exceeds the acceptable viscosity range set by the widely used AC-20R specification for paving asphalt. This specification, issued by the Federal Highway Administration, requires bitumen compositions to have a viscosity in the range of 1600–2400 poise at 140° F. (60° C.). Thus, the modified bitumen compositions produced by the procedures of U.S. Pat. No. 4,145,322 using Kraton®-4141 would be unacceptable for use in road paving under the AC-20R specification.

The second factor complicating the use of bitumen compositions concerns the viscosity stability of such compositions under storage conditions. In this regard, bitumen compositions are frequently stored for up to 7 days or more before being used and, in some cases, the viscosity of the composition can increase so much that the bitumen composition is unusable for its intended purpose. On the other hand, a storage stable bitumen composition would provide for only minimal viscosity increases and, accordingly, after storage it can still be employed for its intended purpose.

The third factor complicating the use of bitumen compositions concerns the use of volatile solvents in such compositions. Specifically, while such solvents have been heretofore proposed as a means to fluidize bitumen-polymer compositions containing relatively small amounts of sulfur which compositions are designed as coatings (Maldonado et al., U.S. Pat. No. 4,242,246), environmental concerns restrict the use of volatile solvents in such compositions. Moreover, the use of large amounts of volatile solvents in bitumen compositions may lower the viscosity of the resulting composition so that it no longer meets viscosity specifications designated for road paving applications. In addition to the volatile components, reduction of other emissions during asphalt applications becomes a target. For example, it is desirable to reduce the amount of sulfur compounds that are emitted during asphalt applications.

Asphaltic concrete, typically including asphalt and aggregate, asphalt compositions for resurfacing asphaltic concrete, and similar asphalt compositions must exhibit a certain number of specific mechanical properties to enable their use in various fields of application, especially when the asphalts are used as binders for superficial coats (road surfacing), as asphalt emulsions, or in industrial applications. (The term "asphalt" is used herein interchangeably with "bitumen." Asphaltic concrete is asphalt used as a binder with appropriate aggregate added, typically for use in roadways.) The use of asphalt or asphalt emulsion binders either in maintenance facings as a surface coat or as a very thin bituminous mix, or as a thicker structural layer of bituminous mix in asphaltic concrete, is enhanced if these binders possess the requisite properties such as desirable levels of elasticity and plasticity.

Previously, various polymers have been added to asphalts to improve physical and mechanical performance properties. Polymer-modified asphalts are routinely used in the road construction/maintenance and roofing industries. Conventional asphalts often do not retain sufficient elasticity in use and, also, exhibit a plasticity range that is too narrow for use in many modern applications such as road construction. It is known that the characteristics of road asphalts and the like can be greatly improved by incorporating into them an elastomeric-type polymer which may be one such as butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of styrene and a conjugated diene. The modified asphalts thus obtained commonly are referred to variously as bitumen/polymer binders or asphalt/polymer mixes. Modified asphalts and asphalt emulsions typically are produced utilizing styrene/butadiene based polymers, and typically have raised softening point, increased viscoelasticity, enhanced force under strain, enhanced strain recovery, and improved low temperature strain characteristics.

The bituminous binders, even of the bitumen/polymer type, which are employed at the present time in road applications often do not have the optimum characteristics at low enough polymer concentrations to consistently meet the increasing structural and workability requirements imposed on roadway structures and their construction. In order to achieve a given level of modified asphalt performance, various polymers are added at some prescribed concentration.

Current practice is to add the desired level of a single polymer, sometimes along with a reactant that promotes cross-linking of the polymer molecules until the desired asphalt properties are met. This reactant typically is sulfur in a form suitable for reacting. Such current processes are discussed in various patents such as U.S. Pat. No. 4,145,322 (Maldonado); U.S. Pat. No. 5,371,121 (Bellamy); and U.S. Pat. No. 5,382,612 (Chauerat), all of which are hereby incorporated by reference.

Other reactants and combinations of reactants are disclosed in U.S. Pat. No. 5,104,916 to Trinh et al., U.S. Pat. No. 3,992,340 to Bonitz and U.S. Pat. No. 4,129,542 to Matheson et. al. Common to these patents is the use of tetramethylthiuram disulfide (TMTDS) and/or stearic acid in significant concentration. Both of these compounds add raw material costs and handling difficulties the present invention avoids. For example, stearic acid, when airborne is a combustible dust. TMTDS is moderately toxic by ingestion but is highly toxic if inhaled. Further, TMTDS has been shown to break down into n-nitroso-dimethylamine in the human stomach, a compound that has been shown to be carcinogenic in test animals. Surprisingly, the present invention achieves the required asphalt properties without the use of TMTDS or stearic acid.

The cost of the polymer also adds significantly to the overall cost of the resulting asphalt/polymer mix. Thus, cost factors weigh in the ability to meet the above criteria for various asphalt mixes. In addition, at increasing levels of polymer concentration, the working viscosity of the asphalt mix becomes excessively great and separation of the asphalt and polymer may occur.

One result of the high viscosities experienced at increased polymer concentrations is that it makes emulsification of the asphalt difficult. As is known in the art and used herein, emulsification of asphalt refers to forming an emulsion of asphalt and water. Asphalt emulsions are desirable in many applications because the emulsion may be applied at lower temperatures than hot-mix asphalts because the water acts as a carrier for the asphalt particles.

For example, hot-mix asphalts, mixes of asphalt, aggregate, and a single polymer, commonly are applied at a temperature of 350° Fahrenheit (F.) to 450° F. (177° Centigrade (C) to 232° C.) to achieve the requisite plasticity for application. In comparison, an asphalt emulsion typically may be applied at 130° F. to 170° F. (54° C. to 77° C.) to achieve the same working characteristics. Emulsified asphalt products are generally used to reduce the release of environmentally-harmful volatile organic compounds normally associated with asphalts diluted with light carrier solvents such as diesel fuel, naphtha, and the like. Emulsification basically requires that the asphalt and any desired performance-enhancing additives be combined with an emulsifying agent in an emulsification mill along with about 20 to 40 percent by weight of water. However, high polymer loading in asphalt produces high viscosities and melting points, making emulsification of the polymer-asphalt composition difficult.

The bitumen/polymer compositions are prepared in practice at polymer contents range from about 3% to 6% by weight of bitumen depending on the nature and the molecular weight of the polymer and the quality of the bitumen. Gelling of the bitumen/polymer composition, which is observed fairly frequently during the preparation of the said composition or while it is stored, occurs as soon as the polymer content of this composition exceeds the above-mentioned threshold. It is thus difficult, in practice, to produce non-gellable bitumen/polymer compositions with a high polymer content, which are more economical to prepare and to transport than bitumen/polymer compositions with a lower polymer content.

In view of the above, bitumen compositions, which simultaneously meet the performance criteria required for road paving, and which are substantially free of volatile solvent would be advantageous. Additionally, viscosity stable bitumen compositions would be particularly advantageous. Further, a method for efficiently introducing the polymer into the bitumen composition would be desirable. In preparing the composition, significant mixing is needed to insure the uniform addition of both the polymer and any crosslinking agents. The crosslinking agents are usually added as a dry powder and mixed with the asphalt compositions.

As can be seen from the above, the art is replete with methods to improve the mixing of asphalt and polymer compositions. The needed elements for the commercial success of any such process include keeping the process as simple as possible, reducing the cost of the ingredients, and utilizing available asphalt cuts from a refinery without having to blend in more valuable fractions. In addition, the resulting asphalt composition must meet the above-mentioned governmental physical properties and environmental concerns. Thus, it is a target of the industry to reduce the cost of the polymers and crosslinking agents added to the asphalt without sacrificing any of the other elements.

BRIEF SUMMARY OF THE INVENTION

The present invention provides a method for preparing a bitumen and elastomeric polymer composition that is advantageous for concentrations of polymer greater than 4 percent by weight of asphalt concrete. In accordance with one embodiment of the present invention, the bitumen is heated up to the desired temperature in a stirred tank. The temperature in the tank is sufficient to allow the stirring of the asphalt and is usually 320° F. or more. A suitable elastomeric polymer is then added and mixing is continued for a period of time. Preferred elastomeric polymers are styrene butadiene copolymers having a styrene content of fifty percent (50%) or less. A composition of crosslinking agents is introduced to the mixture in the tank. Three different crosslinking compositions are utilized comprised of variations of mercaptobenzothiazole, zinc oxide, sulfur, mixed polythiomorpholine, zinc-mercaptobenzothiazole and dithiodimorpholine, all with little or no tetramethylthiuram disulfide or stearic acid. In one embodiment the concentra-

TABLE 1

Properties of Various Asphalt Grades

| TEST | AASHTO M-226 | | | | | |
|---|---|---|---|---|---|---|
| | AC 2.5 | AC 5 | AC 10 | AC 20 | AC 30 | AC 40 |
| Viscosity@140° F., poise (AASHTO T-202) | 250 ± 50 | 500 ± 100 | 1000 ± 200 | 2000 ± 400 | 3000 ± 600 | 4000 ± 800 |
| Viscosity @275° F.; cSt, minimum (AASHTO T-201) | 125 | 175 | 250 | 300 | 350 | 400 |
| Pen. @77° F.; minimum AASHTO t-49) | 220 | 140 | 80 | 60 | 50 | 40 |
| Flash Point, COC Minimum ° F. | 325 | 350 | 425 | 450 | 450 | 450 |
| Ductility After TFOT (AASHTO T-179) @77° F., 5 cm/min, minimum | 100 | 100 | 75 | 50 | 40 | 25 |
| Viscosity After TFOT (AASHTO T-179) @140° F., poise minimum | 1000 | 2000 | 4000 | 8000 | 12000 | 16000 |

| TEST | AR1000 | AR2000 | AR4000 | AR8000 | AR16000 |
|---|---|---|---|---|---|
| Viscosity@140° F., poise (AASHTO T-202) | 1000 + 250 | 2000 + 500 | 4000 + 1000 | 8000 + 2000 | 16000 + 4000 |
| Viscosity@275° F., cSt, minimum (AASHTO T-201) | 140 | 200 | 275 | 400 | 500 |
| Pen. @77° F., minimum (AASHTO T-49) | 65 | 40 | 25 | 20 | 20 |
| Percent of Original Pen. @77° F., minimum | — | 40 | 45 | 50 | 52 |
| Ductility @77° F., minimum, 5 cm/min | 100 | 100 | 75 | 75 | 75 |

Methods of preparing stable bitumen polymer compositions addressing these considerations have been disclosed in U.S. Pat. No. 6,180,697, the contents of which are incorporated herein as if set forth in full. The method steps therein disclose addition of the crosslinking agents containing elemental sulfur, zinc mercaptobenzothiazole, zinc oxide and dithiodimorpholine (as a replacement for sulfur). It is desirable to extend the teachings of U.S. Pat. No. 6,180,697 to include crosslinking agents having enhanced properties or to crosslinking agents that reduce or eliminate hydrogen sulfide emissions from the resultant composition.

tion of the crosslinking agents in the overall composition in the tank should be at least 0.08 percent by weight of mercaptobenzothiazole, at least 0.04 percent by weight of zinc oxide, 0.05 to 0.3 percent by weight of sulfur, less than 0.01 percent by weight of tetramethylthiuram disulfide, and less than 0.02 percent by weight of stearic acid. In another preferred embodiment sulfur as a crosslinking agent is replaced with mixed polythiomorpholine, in which the concentration of the crosslinking agents in the overall composition in the tank should be at least 0.02 percent by weight of mercaptobenzothiazole, at least 0.1 percent by weight of mixed polythiomorpholine, at least 0.03 percent by weight of zinc oxide, less than 0.01 percent by weight of tetramethylthiuram disulfide, and less than 0.02 percent by weight of stearic acid. Another embodiment utilizes zinc-mercaptobenzothiazole and dithiodimorpholine as the crosslinking agents in which the concentration of the crosslinking agents in the overall composition in the tank should be at least 0.05 percent by weight of zinc-mercaptobenzothiazole, at least 0.2 percent by weight of dithiodimorpholine, less than 0.01 percent by weight of tetramethylthiuram disulfide, and less than 0.02 percent by weight of stearic acid. Utilizing these methods bitumen/elastomer compositions are possible that are useful in preparing road-paving compositions.

DETAILED DESCRIPTION OF THE INVENTION

As used herein, the term "bitumen" (sometimes referred to as "asphalt") refers to all types of bitumens, including those that occur in nature and those obtained in petroleum processing. The choice of bitumen will depend essentially on the particular application intended for the resulting bitumen composition. Preferred bitumens have an initial viscosity at 140° F. (60° C.) of 600 to 3000 poise depending on the grade of asphalt desired. The initial penetration range (ASTM D5) of the base bitumen at 77° F. (25° C.) is 50 to 320 dmm, preferably 75 to 150 dmm, when the intended use of the copolymer-bitumen composition is road paving. Bitumens that do not contain any copolymer, sulfur, etc., are sometimes referred to herein as "base bitumen".

As used herein, the term "volatile solvent" refers to a hydrocarbon solvent which has a distillation point or range which is equal to or less than 350° C. Such solvents are known to vaporize to some extent under ambient conditions and, accordingly, pose environmental concerns relating to hydrocarbon emissions.

The term "substantially free of volatile solvent" means that the complete (final) bitumen composition contains less than about 3.5 weight percent of volatile solvent. Preferably, the bitumen composition contains less than about 2 weight percent of volatile solvent and more preferably, less than about 1 weight percent of volatile solvent.

"Elastomeric Polymers" are natural or synthetic rubbers and include butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of styrene and a conjugated dienes. It is preferred to use styrene/conjugated diene block copolymers, linear, radial, or multi-branched. Styrene/butadiene and styrene/isoprene copolymers having an average molecular weight of between 30,000 and 300,000 have been found to be particularly useful in the present invention.

"Conjugated-dienes" refer to alkene compounds having 2 or more sites of unsaturation wherein a second site of unsaturation is conjugated to a first site of unsaturation, i.e., the first carbon atom of the second site of unsaturation is gamma (at carbon atom 3) relative to the first carbon atom of the first site of unsaturation. Conjugated dienes include, by way of example, butadiene, isoprene, 1,3-pentadiene, and the like.

"Block copolymers of styrene and conjugated-dienes" refer to copolymers of styrene and conjugated-dienes having a linear or radial, tri-block structure consisting of styrene-conjugated diene-styrene block units which copolymers are represented by the formula:

$$S_x\text{-}D_y\text{-}S_z$$

where D is a conjugated-diene, S is styrene, and x, y and z are integers such that the number average molecular weight of the copolymer is from about 30,000 to about 300,000.

These copolymers are well known to those skilled in the art and are either commercially available or can be prepared from methods known per se in the art. Preferably, such tri-block copolymers are derived from styrene and a conjugated-diene, wherein the conjugated-diene is butadiene or isoprene. Such copolymers preferably contain 15 to 50 percent by weight copolymer units derived from styrene, preferably 25 to 35 percent derived from styrene, more preferably 28 to 31 percent derived from styrene, the remainder being derived from the conjugated diene.

These copolymers preferably have a number average molecular weight range between 50,000 and 200,000, more preferably between 70,000 and 180,000. The copolymer can employ a minimal amount of hydrocarbon solvent in order to facilitate handling. Examples of suitable solvents include plasticizer solvent, which is a non-volatile aromatic oil. However, when the hydrocarbon solvent is a volatile solvent (as defined above), care should be taken to ensure that the amount of solvent contained in the final bitumen composition is less than about 3.5 weight percent.

The term "sulfur" refers to elemental sulfur in any of its physical forms or any sulfur donating compound. Sulfur donating compounds are well known in the art and include various organic compositions or compounds that generate sulfur under the mixing or preparation conditions of the present invention. Preferably, the elemental sulfur is in powder form known as flowers of sulfur.

The term "desired Rheological Properties" refers to bitumen compositions having a viscosity at 140° F. (60° C.) of from 1600 to 4000 poise before aging; a toughness of at least 110 inch-pound (127 cm-kilograms) before aging; a tenacity of at least 75 inch-pound (86.6 cm-kilograms) before aging; and a ductility of at least 25 cm at 39.2° F. (4° C.) at 5 cm/min. pull rate after aging. Each of these desired Rheological Properties are necessary parameters in meeting the AC-20(R) specifications for bitumen compositions suitable for use as road pavement material (See Table 1).

Viscosity measurements are made by using ASTM test method D2171. Ductility measurements are made by using ASTM test method D113. Toughness and tenacity measurements are made by a Benson Method of Toughness and Tenacity, run at 20 inches/minute (50.8 cm/minute) pull rate with a ⅛-inch (2.22 cm) diameter ball.

By "storage stable viscosity" it is meant that the bitumen composition shows no evidence of skinning, settlement, gelation, or graininess and that the viscosity of the composition does not increase by a factor of four or more during storage at 325°+/−5° F. (163°+/−2.8° C.) for seven days. Preferably the viscosity does not increase by a factor of two or more during storage at 325° F. (163° C.) for seven days. More preferably the viscosity increases less than 50% during seven days of storage at 325° F. (163° C.). A substantial increase in the viscosity of the bitumen composition during storage is not desirable due to the resulting difficulties in handling the composition and in meeting product specifications at the time of sale and use.

The term "aggregate" refers to rock and similar material added to the bitumen composition to provide an aggregate composition suitable for paving roads. Typically, the aggregate employed is rock indigenous to the area where the bitumen composition is produced. Suitable aggregate includes granite, basalt, limestone, and the like.

As used herein, the term "asphalt cement" refers to any of a variety of substantially unblown or unoxidized solid or semi-solid materials at room temperature that gradually liquefy when heated. Its predominant constituents are bitumens, which may be naturally occurring or obtained as the residue of refining processing. The asphalt cements are generally characterized by a penetration (PEN, measured in tenths of a millimeter, dmm) of less than 400 at 25° C., and a typical penetration is between 40 and 300 (ASTM Standard, Method D-5). The viscosity of asphalt cement at 60° C. is more than about 65 poise. Asphalt cements are often defined in terms specified by the American Association of State Highway Transportation Officials (AASHTO) AR viscosity system, also known as SHRP (Superpave Highway Research Program). Two sets of typical specifications are shown in Table 1.

The asphalt terms used herein are well known to those skilled in the art. For an explanation of these terms, reference is made to the booklet SUPERPAVE Series No. 1 (SP-1), 1997 printing, published by the Asphalt Institute (Research Park Drive, P.O. Box 14052, Lexington, Ky. 40512-4052), which is hereby incorporated by reference in its entirety. For example, Chapter 2 provides an explanation of the test equipment, terms, and purposes. Rolling Thin Film Oven (RTFO) and Pressure Aging Vessel (PAV) are used to simulate binder aging (hardening) characteristics. Dynamic Shear Rheometers (DSR) are used to measure binder properties at high and intermediate temperatures. This is used to predict permanent deformation or rutting and fatigue cracking. Bending Beam Rheometers (BBR) are used to measure binder properties at low temperatures. These values predict thermal or low temperature cracking. The procedures for these experiments are also described in the above-referenced SUPERPAVE booklet.

Asphalt grading is given in accordance with accepted standards in the industry as discussed in the above-referenced Asphalt Institute booklet. For example, pages 62–65 of the booklet include a table entitled Performance Graded Asphalt Binder Specifications. The asphalt compositions are given performance grades, for example, PG 64-22. The first number, 64, represents the average 7-day maximum pavement design temperature in ° C. The second number, –22, represents the minimum pavement design temperature in ° C. Other requirements of each grade are shown in the table. For example, the maximum value for the PAV-DSR test (° C.) for PG 64-22 is 25° C.

Industry custom uses the short form RTFO DSR to indicate the temperature at which a sample will show sufficient rutting resistance after rolling thin film oven (RTFO) aging (minimum rutting resistance as defined as a "G*/sin δ" over 2.20 kPA and measured by a dynamic shear rheometer (DSR)). Similarly, m-value is the short form to indicate the minimum temperature in degrees Centigrade at which a sample will exceed an m-value of 0.300 after 60 seconds of loading on the bending beam rheometer.

One of the methods commonly utilized in the industry to standardize the measure or degree of compatibility of the rubber with the asphalt is referred to as the compatibility test. The test comprises the mixing of the rubber and asphalt with all the applicable additives, such as the crosslinking agents. The mixture is placed in tubes, usually made of aluminum or similar material, referred to as cigar tubes or toothpaste tubes. These tubes are about one inch in diameter and about fifty centimeters deep. The mixture is placed in an oven heated to a temperature of about 162° C. (320° F.). This temperature is representative of the most commonly used asphalt storage temperature.

After the required period of time, most commonly twenty-four (24) hours, the tubes are transferred from the oven to a freezer and cooled down to solidify. The tubes are kept in the vertical position. After cooling down, the tubes are cut in one thirds, three equal sections. The softening point of the top one third is compared to the softening point of the bottom section. This test gives an indication of the separation or compatibility of the rubber within the asphalt. The rubber would have the tendency to separate to the top. The lower the difference in softening point between the top and bottom sections, the more compatible are the rubber and asphalt. In today's environment, most states require a difference of 4° F. (2° C.) or less to consider the asphalt/rubber composition as compatible. Few standards allow a higher difference. The twenty-four hour test is used as a common comparison point.

This invention teaches the preparation of asphalt and polymer compositions which can be made to have properties that comply with Federal standards for grade AC-20. In one embodiment the invention includes the method for preparing asphalt and polymer compositions by heating the asphalt in a stirred tank to a temperature sufficient to allow stirring of the asphalt in the tank, wherein said temperature is at least 330° F. but preferably not more than 380° F. A thermoplastic elastomer is added, preferably a styrene-butadiene polymer, to the tank in an amount not greater than twelve percent and preferably not greater than ten percent by weight of the total composition to form a mixture. A crosslinking composition is added to the composition and stirring is continued for at least forty-five minutes while maintaining the temperature.

The crosslinking composition is comprised of at least 0.08 percent by weight based on the asphalt of 2-mercaptobenzothiazole, from 0.08 to 0.3 percent by weight based on the asphalt of elemental sulfur, and at least 0.04 percent by weight based on the asphalt of zinc oxide, preferably in the ratio of 2-mercaptobenzothiazole to zinc oxide to elemental sulfur of 2.0/1.0/2.0. The amount of 2-mercaptobenzothiazole added is preferably from 2 percent to 5 percent by weight of thermoplastic elastomer.

Another embodiment of the invention also teaches the preparation of an asphalt composition having properties that comply with or exceed Federal standards for grade AC-20. In accordance with this embodiment, the crosslinking agents comprise zinc 2-mercaptobenzothiazole and dithiodimorpholine. The similar method comprises heating the asphalt in a stirred tank to a temperature sufficient to allow stirring of the asphalt in the tank, wherein said temperature is at least 330° F. A thermoplastic elastomer is added, to the tank in an amount not greater than twelve percent to form a mixture. A crosslinking composition is added to the composition and stirring is continued for at least forty-five minutes while maintaining the temperature.

The crosslinking composition is comprised of at least 0.05 percent by weight based on the asphalt of zinc 2-mercaptobenzothiazole and at least 0.2 percent by weight based on the asphalt of dithiodimorpholine, preferably in the ratio of zinc 2-mercaptobenzothiazole to dithiodimorpholine of 1.0/4.0.

Other embodiments of this invention, which can be made to comply with Federal standards for grade AC-20, use 2-mercaptobenzothiazole, zinc oxide and mixed polythiodimorpholine as the crosslinking agents. One such embodiment includes the method of heating the asphalt in a stirred tank to a temperature sufficient to allow stirring of the asphalt in the tank, wherein said temperature is at least 330° F. but preferably not more than 380° F. A thermoplastic elastomer is added, preferably a styrene-butadiene polymer, to the tank in an amount not greater than twelve percent and preferably not greater than ten percent by weight of the total composition to form a mixture. A crosslinking composition is added to the composition and stirring is continued for at least forty-five minutes while maintaining the temperature.

The crosslinking composition is comprised of at least 0.02 percent and preferably 0.06 percent by weight based on the asphalt of 2-mercaptobenzothiazole, at least 0.1 and preferably at least 0.2 percent by weight based on the asphalt of mixed polythiomorpholine, at least 0.03 percent and preferably 0.06 percent by weight based on the asphalt of zinc oxide and preferably in the ratio of 2-mercaptobenzothiazole to zinc oxide to mixed polythiomorpholine of 0.3/0.3/1.0. Further, the amount of 2-mercaptobenzothiazole added is preferably from 2 percent to 5 percent by weight of thermoplastic elastomer.

Mixed polythiomorpholine is a mixture of polythiomorpholine molecules. Each polythiomorpholine has from two to eight sulfur atoms in a central chain and a morpholine molecule attached to each end of the sulfur chain. For example, trithiodimorpholine has a central chain of three sulfur atoms with a terminating morpholine molecule attached to sulfur atoms one and three.

The asphalt is added and stirred at elevated temperatures. Stirring temperatures depend on the viscosity of the asphalt and can range up to 500° F. Asphalt products from refinery operations are well known in the art. For example, asphalts typically used for this process are obtained from deep vacuum distillation of crude oil to obtain a bottom product of the desired viscosity or from a solvent deasphalting process that yields a demetalized oil, a resin fraction and an asphaltene fraction. Some refinery units do not have a resin fraction. These materials or other compatible oils of greater than 450° F. flash point may be blended to obtain the desired viscosity asphalt.

Rubbers, elastomeric polymers or thermoplastic elastomers suitable for this application are well known in the art as described above. For example, Finaprene products available from ATOFINA Petrochemicals, Inc. are suitable for the applications of the present invention. This example is not limiting for the technology, which can be applied to any similar elastomeric product particularly those produced from styrene and butadiene.

U.S. Pat. No. 6,180,697 discloses testing and discovery of preferred crosslinking agents comprised of organic zinc compounds, elemental sulfur and/or sulfur donors. The contents of U.S. Pat. No. 6,180,697 are incorporated herein as if set forth in full. In particular, sulfur is used in combination with zinc 2-mercaptobenzothiazole (ZMBT hereafter) and zinc oxide. However, it was noted that gel formation was problematic. Gels occurred when sulfur concentration exceeded 0.3% (relative to asphalt) when 4.0% Finaprene® FP401 elastomer is used.

During preparation of these bitumen/polymer compositions hydrogen sulfide emissions can occur when elemental sulfur is used as one of the crosslinking agents. To eliminate or reduce hydrogen sulfide emissions, sulfur-donating compounds are used in place of the elemental sulfur. Sulfur donating compounds include, among other compounds, mercaptobenzothiazole (MBT hereafter), dithiodimorpholine (DTDM hereafter), mixed polythiomorpholine (MPTM hereafter) and ZMBT.

Raw material costs can be extremely critical to the profitable manufacture of bitumen/polymer compositions. As a result it was found desirable to test a variety of crosslinking agents to determine compatibility and allow for future minimization of raw material costs. Testing was performed with various crosslinking agents both with and without elemental sulfur and with various polymers as shown in the tables below.

Three different polymers were selected for tests, namely Finaprene® FP502, FP401, and FP411. These polymers were selected for use in the tests due to their beneficial effects In aiding bitumen compositions in passing SHRP (Superpave Highway Research Program testing and grading specifications are maintained by MSHTO). Finaprene® FP502 and FP411 are styrene-butadiene block copolymers having a butadiene/styrene ratio of 69/31 and are available from ATOFINA Petrochemicals, Inc., Houston, Tex., Finaprene® FP401 is a styrene-butadiene block copolymer having a butadiene/styrene ratio of 78/22 and is available from ATOFINA Petrochemicals, Inc., Houston, Tex.

The procedure for testing the bitumen/elastomer compositions consisted of adding the polymer to a mixing tank containing molten base bitumen at 350° F. with stirring at 2500 RPM for 45 minutes. Stirring was reduced to low shear of 250 RPM and crosslinking agents were then added. Stirring was continued for 3 hours. The material was allowed to stand without stirring for 24 hours at 350° F. Samples were taken for compatibility testing and SHRP grading. The particular polymer and crosslinking agents of each test are identified in the respective tables.

TABLE 2

| | MBT/ZnO/S Crosslinker | | | | | |
|---|---|---|---|---|---|---|
| Sample number | 964-80 | 964-81A | 982-02 | 964-81B | 964-82A | 964-82B |
| Base Bitumen - wt % | 100 | 96 | 96 | 96 | 96 | 96 |
| Polymer - wt % | — | 4% FP502 | 4% FP502 | 4% FP502 | 4% FP401 | 4% FP401 |
| Crosslinker - ZMBT wt % | — | — | 0.05 | — | — | — |
| Crosslinker - DTDM wt % | — | — | 0.2 | — | — | — |
| Crosslinker - MBT wt % | — | — | — | 0.08 | — | 0.08 |
| Crosslinker - ZnO wt % | — | — | — | 0.04 | — | 0.04 |
| Crosslinker - S wt % | — | — | — | 0.08 | — | 0.08 |
| Crosslinker TMTDS wt % | — | — | — | — | — | — |
| Crosslinker - stearic wt % | — | — | — | — | — | — |
| Compatibility Test: | | | | | | |
| Top number Degrees Fahrenheit | — | 191.7 | 188.6 | 175.3 | 182.2 | 172.1 |
| Compatibility Delta Temp. Degrees F. | — | 39.6 | 22.1 | 0.2 | 31.8 | 8.5 |

TABLE 2-continued

| | MBT/ZnO/S Crosslinker | | | | | |
|---|---|---|---|---|---|---|
| Sample number | 964-80 | 964-81A | 982-02 | 964-81B | 964-82A | 964-82B |
| SHRP Testing: | | | | | | |
| Binder DSR | 66.2 | | | 85.8 | | 83 |
| RTFO DSR, | 70.5 | | | 90.5 | | 87.8 |
| PAV DSR | 23.6 | | | 21.9 | | 22.3 |
| M-value | −11.76 | | | −13.54 | | −13.54 |
| S-value | −22.99 | | | −21.77 | | −23.3 |
| SHRP Grade | PG64-16 | | | PG82-22 | | PG82-22 |

Table 2 indicates that relatively incompatible polymers can be used in a bitumen/polymer composition using a combination of MBT, ZnO and elemental sulfur as the crosslinking agents. In contrast, sample 982-02 using ZMBT and DTDM with the styrene-butadiene polymer FP502 did not produce an acceptable formulation (compatibility delta temperature of 22.1 degrees). However, using MBT, ZnO and sulfur in a ratio of 0.08/0.04/0.08 allowed a compatible composition with superior SHRP grade improvement. The SHRP higher temperature grade improved from 64 to 82 degrees Centigrade, while the SHRP lower temperature grade improved from −16 to −22 degrees Centigrade.

The other polymer tested in Table 2 also demonstrated improved results using MBT/ZnO/S crosslinking agents. An equivalent improved SHRP grade was obtained with Finaprene® FP411. Adjustments may be made depending upon a customer's compatibility specification. Hence it is seen that the crosslinking system of this invention is applicable to various styrene-butadiene polymers.

As is also seen in Table 2, the performance of the present invention is achieved without the addition of tetramethylthiuram disulfide (TMTDS) or stearic acid. Hence, the present invention avoids the additional expense, handling, toxicity and dust explosion risk associated with these compounds.

Table 3 identifies test samples that resulted in gel formation. Samples made using the extremely incompatible Finaprene® FP411 polymer (incompatibility of 94° F. delta temp.) with the MBT/ZnO/S crosslinking system did not result in acceptable compositions. At high polymer concentrations problems were found with all three polymers tested. For example, with a 10 percent weight of polymer, two of the polymers formed gels with the MBT/ZnO/S crosslinking system, while the third polymer developed a crust after 24 hours of aging.

Similar to the examples of Table 2, for all of the examples of Table 3, no tetramethylthiuram disulfide (TMTDS) or stearic acid was added.

TABLE 3

| | MBT/ZnO/S Crosslinker | | | | |
|---|---|---|---|---|---|
| Sample number | 964-83A | 964-83B | 964-85 | 964-86 | 964-87 |
| Base Bitumen - wt % | 96 | 96 | 90 | 90 | 90 |
| Polymer - wt % | 4% FP411 | 4% FP411 | 10% FP502 | 10% FP401 | 10% FP411 |
| Crosslinker - ZMBT wt % | — | — | — | — | — |

TABLE 3-continued

| | MBT/ZnO/S Crosslinker | | | | |
|---|---|---|---|---|---|
| Sample number | 964-83A | 964-83B | 964-85 | 964-86 | 964-87 |
| Crosslinker - DTDM wt % | — | — | — | — | — |
| Crosslinker - MBT wt % | — | 0.08 | 0.2 | 0.2 | 0.2 |
| Crosslinker - ZnO wt % | — | 0.04 | 0.1 | 0.1 | 0.1 |
| Crosslinker - S wt % | — | 0.080 | 0.2 | 0.2 | 0.2 |
| Crosslinker - TMTDS wt % | — | — | — | — | — |
| Crosslinker - stearic wt % | — | — | — | — | — |
| Compatibility Test: | | Gelled | 24 hr crust | Gelled | Gelled |
| Top number Degrees Fahrenheit | 235.7 | — | — | — | — |
| Compatibility Delta Temp. Degrees F. | 94 | — | — | — | — |

A final test of the MBT/ZnO/S crosslinking system (also without added TMTDS or stearic acid) was to determine the effect dilution has on polymer compatibility. Polymer Finaprene® FP502 was selected for this test due to its high incompatibility (39.6 degrees delta Temperature without crosslinking agents). Bitumen/polymer compositions with identical compositions of bitumen, polymer, and crosslinking agents were prepared using different methods and their results compared in Table 4. Once again, no additional tetramethylthiuram disulfide (TMTDS) or stearic acid was added.

The first procedure used to prepare the 4% polymer/bitumen composition was to follow the previously described procedure. Polymer is added to a mixing tank containing molten base bitumen at 350° F. with stirring at 2500 RPM for 45 minutes. Stirring was reduced to low shear of 250 RPM and crosslinking agents were then added.

The alternate method of preparing the 4% polymer/bitumen composition is to first prepare a 10% polymer/bitumen/crosslink agent composition and then mix this composition with additional bitumen at a ratio of 60% bitumen to 40% of 10% polymer composition. The result is a composition with 4% polymer.

Table 4 demonstrates that the first procedure is superior to the alternate procedure of diluting a 10% polymer composition. Under the first procedure compatibility was extremely satisfactory (0.2 degree delta temperature) while the alternate procedure did not make the composition compatible (22.1 degree delta temperature).

TABLE 4

Effect of Dilution

| Sample number | 964-81A | Direct addition 964-81B | Dilution from Concentrate 964-88 | Concentrate 964-85 |
|---|---|---|---|---|
| Base Bitumen- wt % | 96 | 96 | 96 | 90 |
| Polymer-wt % | 4% FP502 | 4% FP502 | 4% FP502 | 10% FP502 |
| Crosslinker-ZMBT wt % | — | — | — | — |
| Crosslinker-DTDM wt % | — | — | — | — |
| Crosslinker-MBT wt % | — | 0.08 | 0.08 | 0.2 |
| Crosslinker-ZnO wt % | — | 0.04 | 0.04 | 0.1 |
| Crosslinker-S wt % | — | 0.08 | 0.08 | 0.2 |
| Crosslinker TMTDS wt % | — | — | — | — |
| Crosslinker-stearic wt % | — | — | — | — |
| Compatibility Test: | | | | |
| Top number Degrees Fahrenheit | 191.7 | 175.3 | 189.1 | |
| Compatibility Delta Temp. Degrees F. | 39.6 | 0.2 | 22.1 | |

An alternate to the use of sulfur in the crosslinking system was tested, with results indicated in Tables 5 and 6. Specifically mixed polythiomorpholine (MPTM) is used in place of sulfur. Table 5 shows the effect of increasing the amount of MPTM has upon the composition when avoiding the added use of TMTDS or stearic acid. It was concluded that a minimum amount of 0.2% MPTM is required in order to achieve a compatible composition with 4% FP502 elastomer.

TABLE 5

Increasing Amounts of MPTM

| Sample number | 964-80 | 982-02 | 982-03 | 982-08 | 982-09 | 982-07 |
|---|---|---|---|---|---|---|
| Base Bitumen - wt % | 100 | 96 | 96 | 96 | 96 | 96 |
| Polymer - wt % | | 4% FP502 | 4% FP502 | 4% FP502 | 4% FP502 | 4% FP502 |
| Crosslinker - ZMBT wt % | — | 0.05 | — | — | — | — |
| Crosslinker - DTDM wt % | — | 0.2 | — | — | — | — |
| Crosslinker - MBT wt % | — | — | 0.06 | 0.04 | 0.06 | 0.06 |
| Crosslinker - MPTM wt % | — | — | 0.05 | 0.13 | 0.2 | 0.2 |
| Crosslinker - ZnO wt % | — | — | 0.06 | 0.033 | 0.1 | 0.06 |
| Crosslinker - TMTDS wt % | — | — | — | — | — | — |
| Crosslinker - stearic wt % | — | — | — | — | — | — |
| Compatibility Test: | | | | | | |
| Top number Degrees Fahrenheit | — | 188.6 | 201.8 | 178.1 | 179.1 | 170.9 |
| Compatibility Delta Temp. Degrees F. | — | 22.1 | 28 | 14.8 | 10.4 | 1.2 |

Table 6 shows the results of using 0.2% MPTM and varying MBT and ZnO amounts in a 4% polymer/bitumen composition. The 4% polymer/bitumen composition was not compatible until sufficient MBT and ZnO are included as crosslinking agents, and preferably 0.06% of each.

TABLE 6

MPTM w/ZnO and MBT

| Sample number | 964-80 | 982-04 | 982-06 | 982-05 | 982-07 |
|---|---|---|---|---|---|
| Base Bitumen - wt % | 100 | 96 | 96 | 96 | 96 |
| Polymer - wt % | — | 4% FP502 | 4% FP502 | 4% FP502 | 4% FP502 |
| Crosslinker - DTDM % | — | — | — | — | — |
| Crosslinker - MBT wt % | — | 0.02 | 0.06 | 0.02 | 0.06 |
| Crosslinker - MPTM % | — | 0.2 | 0.2 | 0.2 | 0.2 |
| Crosslinker - ZnO % | — | 0.005 | 0.005 | 0.06 | 0.06 |
| Crosslinker - TMTDS % | — | — | — | — | — |
| Crosslinker - stearic % | — | — | — | — | — |
| Compatibility Test: | | | | | |
| Top number Degrees Fahrenheit | — | 184.7 | 174.9 | 172.6 | 170.9 |
| Compatibility Delta Temp. Degrees F. | — | 26.1 | 5.2 | 11.4 | 1.2 |
| SHRP Testing: | | | | | |
| Binder DSR | 66.2 | 87.98 | 87 | 86.8 | |
| RTFO DSR | 70.5 | 89.1 | 88.3 | 85.1 | |
| PAV DSR | 23.6 | 11.8 | 18.2 | 17.7 | |
| M-value | −11.76 | −13.82 | −11.35 | −14.94 | |
| S-value | −22.99 | −21.27 | −28.24 | −21.09 | |
| SHRP Grade | PG64-16 | | PG82-22 | PG82-16 | PG82-22 |

A comparison of the two crosslinking systems disclosed, indicates that both enhance SHRP properties in a polymer/bitumen composition. The MBT/ZnO/S system of Table 2 compares in performance with the MBT ZnO MPTM system of Table 6. By having multiple viable crosslinking systems available allows the minimization of raw material costs during the production of SHRP polymer/bitumen compositions. Both the examples of Table 2 and of Table 6 show that improved properties are achieved without the additional use of tetramethylthiuram disulfide or stearic acid. At present market prices, the MBT/ZnO/S system is more cost effective. This may change, however, with market fluctuations or between different producers.

While certain representative embodiments and details have been shown for the purpose of illustrating the subject invention, it will be apparent to those skilled in the art that various changes and modifications can be made therein without departing from the scope of the subject invention.

Although the present invention has been described in terms of specific embodiments, various substitutions of materials and conditions can be made as will be known to those skilled in the art. For example, other elastomeric polymers have similar properties as those tested above. Additionally, other variations are apparent to those skilled in the art and are meant to be included herein. The scope of the invention is only to be limited by the following claims.

What is claimed is:

1. A method for preparing asphalt and polymer compositions comprising:
   heating the asphalt in a stirred tank to a temperature sufficient to allow stirring of the asphalt in the tank, wherein said temperature is at least 330° F.;
   adding an elastomeric polymer to the tank in an amount not greater than twelve percent by weight of the total composition to form a mixture;
   adding a crosslinking composition to the composition; continue stirring and maintain the temperature in the tank for at least forty-five minutes, wherein the crosslinking composition consists essentially of at least 0.08 to 0.3 percent by weight based on the asphalt of 2-mercaptobenzothiazole, from 0.08 to 0.3 percent by weight based on the asphalt of elemental sulfur, and at least 0.04 to 0.15 percent by weight based on the asphalt of zinc oxide.

2. The method of claim 1 wherein the elastomeric polymer is a styrene-butadiene polymer.

3. The method of claim 1 wherein the ratio of 2-mercaptobenzothiazole to zinc oxide to elemental sulfur is 2.0/1.0/2.0.

4. The method of claim 1 wherein the elastomeric polymer does not exceed 10 percent by weight of the total composition.

5. The method of claim 1 wherein the asphalt is heated to a temperature not greater than 380° F. prior to the addition of the crosslinking composition.

6. The asphalt composition made in accordance with claim 1 wherein the asphalt properties comply with Federal standards for grade AC-20.

7. A method for preparing asphalt and polymer compositions comprising:
   heating the asphalt in a stirred tank to a temperature sufficient to allow stirring of the asphalt in the tank, wherein said temperature is at least 330° F.;
   adding an elastomeric polymer to the tank in an amount not greater than twelve percent by weight of the total composition to form a mixture;
   adding a crosslinking composition to the composition: continue stirring and maintain the temperature in the tank for at least forty-five minutes, wherein the crosslinking composition consists essentially of at least 0.02 to 0.2 percent by weight based on the asphalt of 2-mercaptobenzothiazole, at least 0.1 to 0.67 percent by weight based on the asphalt of mixed polythiomorpholine and at least 0.005 to 0.2 percent by weight based on the asphalt of zinc oxide.

8. The method of claim 7 wherein the elastomeric polymer is a styrene-butadiene polymer.

9. The method of claim 7 wherein the ratio of 2-mercaptobenzothiazole to zinc oxide to mixed polythiomorpholine is 0.3/0.3/1.0.

10. The method of claim 7 wherein the elastomeric polymer does not exceed 10 percent by weight of the total composition.

11. The method of claim 7 wherein the asphalt is heated to a temperature not greater than 380° F. prior to the addition of the crosslinking composition.

12. The asphalt composition made in accordance with claim 7 wherein the asphalt properties comply with Federal standards for grade AC-20.

13. A method for preparing asphalt and polymer compositions comprising: heating the asphalt in a stirred tank to a temperature sufficient to al low stirring of the asphalt in the tank, wherein said temperature is at least 330° F.; adding an elastomeric polymer to the tank in an amount not greater than ten percent by weight of the total composition to form a mixture; adding a crosslinking composition to the composition; continue stirring and maintain the temperature in the tank for at least forty-five minutes; wherein the asphalt is heated to a temperature not greater than 380° F. prior to the addition of the crosslinking composition; wherein the elastomeric polymer is a styrene-butadiene polymer; wherein the crosslinking composition consists essentially of at least 0.08 to 0.3 percent by weight based on the asphalt of 2-mercaptobenzothiazole, from 0.08 to 0.3 percent by weight based on the asphalt of elemental sulfur and at least 0.04 to 0.15 percent by weight based on the asphalt of zinc oxide: wherein the ratio of 2-mercaptobenzothiazole to zinc oxide to elemental sulfur is 2.0/1.0/2.0 and; with the proviso that 2-mercaptobenzothiazole is present in amounts from 2 percent to 5 percent by weight of elastomeric polymer.

* * * * *